TWO-REEL CARTRIDGES HAVING REFLECTING MEANS

Filed July 14, 1967 2 Sheets-Sheet 1

INVENTORS
ROBERT H. HANES
ROBERT J. YOUNGQUIST
BY Carpenter, Kinney & Coulter
ATTORNEYS

TWO-REEL CARTRIDGES HAVING REFLECTING MEANS

Filed July 14, 1967 2 Sheets-Sheet 2

INVENTORS
ROBERT H. HANES
ROBERT J. YOUNGQUIST
BY Carpenter, Kinney & Coulter
ATTORNEYS United States Patent Office 3,497,157
Patented Feb. 24, 1970

3,497,157
TWO-REEL CARTRIDGES HAVING REFLECTING MEANS

Robert H. Hanes, Stillwater, and Robert J. Youngquist, Arden Hills, Minn., assignors to Minnesota Mining and Manufacturing Company, St. Paul, Minn., a corporation of Delaware Filed July 14, 1967, Ser. No. 653,447
Int. Cl. G11b *15/32, 23/04, 15/08*
U.S. Cl. 242—188 6 Claims

ABSTRACT OF THE DISCLOSURE

A tape cartridge capable of use in combination with a recorder/reproducer is disclosed wherein the recorder/reproducer includes a reel flange engaging driving means for driving two reels mounted in a coplanar relationship within the cartridge, a light source and a light responsive device which cooperates with a reflecting means located within the cartridge to pass a light beam once through the tape for indicating such conditions as end-of-tape, the cartridge further including a locking means for locking the reels in the cartridge upon removal of the cartridge from the recorder/reproducer, and a pinch roller connected to the reel locking means and cooperating with the capstan of the recorder/reproducer to release the reel locking means upon insertion of the cartridge into the recorder/reproducer.

Cartridges are known which have a pair of reels mounted in a coplanar relationship therein. Certain of these cartridges are capable of insertion in a planar direction or in a sliding manner into a recorder/reproducer. In such cartridges, the reels or hubs are adapted to be driven axially. Means are normally provided for switching the driving means from one reel or hub to the other for bi-directional driving.

One disadvantage associated with cartridges utilizing axial drive is the need for complicated interfacing between drive shafts and the hubs within the cartridge. This requirement makes it difficult to design a cartridge for insertion into a recorder/reproducer in a planar direction or in a sliding manner. Certain of the prior art devices attempt to overcome this disadvantage by using a single reel flange drive or a driving roller which releasably engages the surface of the wound strip member to drive both the strip member and reel. However, such devices do not provide separate driving means for the reels and strip member.

A drive means for driving only one reel or hub has the disadvantage of applying uneven tension to the strip member. The inertia of the supply reel decreases with time and this change is not compensated for if the driving means are applied only to the take-up reel.

Heretofore, end-of-tape sensing has been used in several prior art cartridges. For example, one known cartridge, having an axial drive for the reels, utilizes a single, internal prism for sensing end-of-tape. The cartridge has been used in combination with a recorder/reproducer having an externally mounted light source and light responsive means positioned in a planar relationship to each other. Such a combination requires the light beam to pass through the strip member a plurality of times.

One disadvantage of passing a light beam through a strip member more than once is that insufficient light may reach the light responsive means. Factors which reduce light transmission include a smudged or scratched tape and the like.

Another known cartridge having an axial drive for the reels utilizes a light beam which passes only once through both a transparent section of a strip member or tape and a transparent hub to sense end-of-tape. In such cartridges, a photosensing device is located within the transparent hub. A single light source is mounted on the recorder/reproducer for passing light into the vicinity of both hubs. When the cartridge is loaded into the recorder/reproducer, the light source and the light responsive means must be positioned within the cartridge.

The disadvantages of this arrangement include the need for a specially designed reel with a recessed, transparent hub. Further, the combination requires special interfacing to allow the cartridge to receive both the light source and the light responsive means. This imposes the further requirement that the cartridge be top-loading to facilitate interfacing. In addition, the transparent section of the strip member must be located at either the beginning or at the end of the tape. If a transparent section of the tape is located at a position other than the end of the tape, the windings of the strip member about the hub would prevent detection or location of the transparent section.

A standard feature of certain known cartridges is a reel lock mechanism which prevents the reel or reels from moving when the cartridge is removed from the recorder/reproducer. One such device utilizes a triangular-shaped lock which is spring-loaded to forcibly engage the rims of the reels when the cartridge is removed from the recorder/reproducer. The under-surface of such triangular-shaped lock is recessed to receive a vertical pin located on the recorder/reproducer which disengages the lock when the cartridge is loaded.

A disadvantage of this arrangement is that the vertical pin must engage the reel lock mechanism thereby complicating the interfacing required between the cartridge and the recorder/reproducer. Such an arrangement makes it difficult for such cartridges to be designed for planar insertion into a recorder/reproducer apparatus.

The present invention overcomes the disadvantages associated with known prior art cartridges including those noted herein.

One advantage of the cartridge of the present invention is that the cartridge can be easily inserted in a planar direction into a recorder/reproducer.

Another advantage of the cartridge of the present invention is that a light responsive sensing system utilizing a single optical path transmission is used to indicate strip member position.

A further advantage of the cartridge of the present invention is that a reel lock is automatically disengaged when the cartridge is inserted into a recorder/reproducer.

Another advantage of the present invention is that complicated interfacing is avoided and a simple edge-of-reel driving means can be utilized for driving the reels.

Yet another advantage of the present invention is that a recorder/reproducer having differential drive can be used to maintain even tension of the strip member.

Another advantage of the present invention is that a cartridge utilizing a single light path transmission can be used in combination with a recorder/reproducer.

These and other advantages of the present invention will become apparent from the following description of a preferred embodiment taken together with the drawing wherein.

Figure 2:
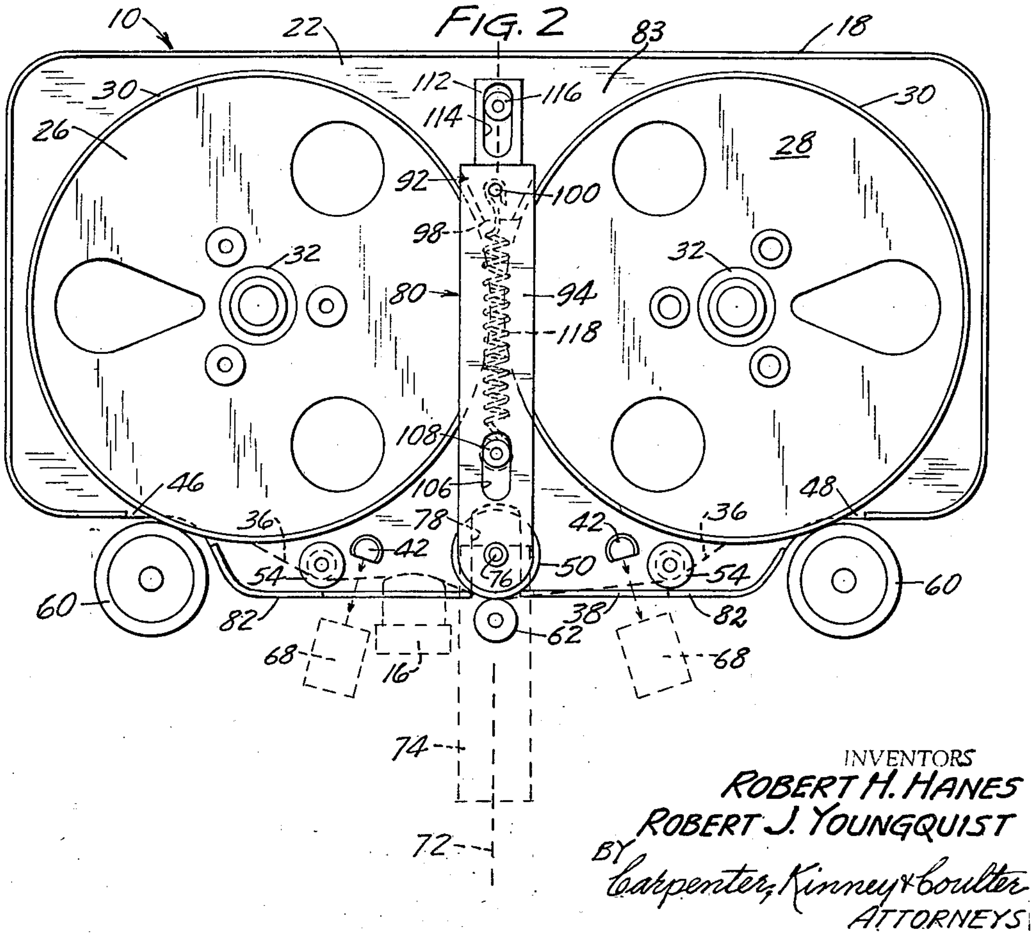
FIGURE 2 is a top view of one embodiment of a cartridge of the present invention with the upper portion thereof removed and wherein the cooperating elements from the recorder/reproducer are illustrated diagrammatically.
Figure 5:
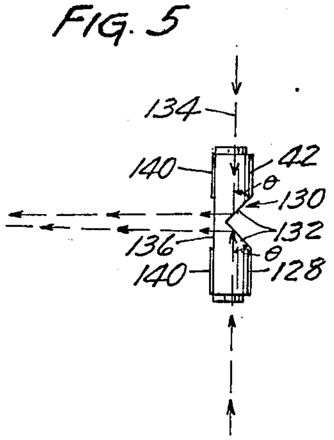
FIGURE 5 is a diagramamtic representation of a reflector adapted for use in the cartridge of FIGURE 2.
Figure 6:
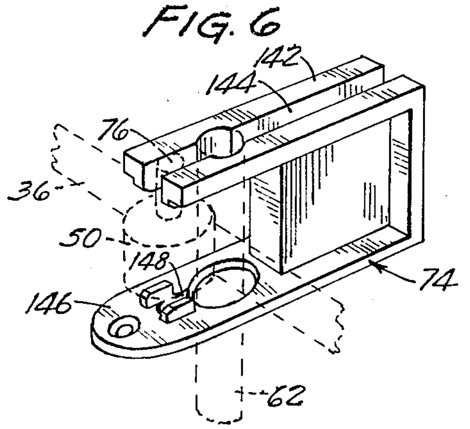
Figure 7A:
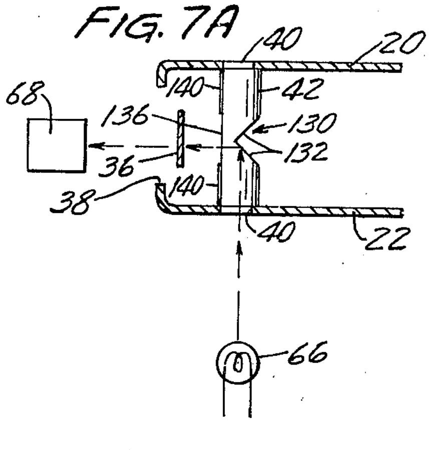
Figure 7B:
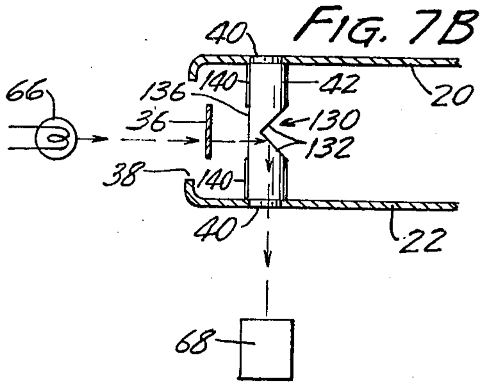

FIGURE 6 is a diagrammatic illustration of an alignment means illustrated in FIGURE 2 and located on a recorder/reproducer for cooperating with a pinch roller, the strip member and a driving capstan for providing alignment therebetween; and FIGURES 7A and 7B are diagrammatic representations of the reflector of FIGURE 5 illustrating two arrangements for a light source and a light responsive means relative to a cartridge.

Briefly, this invention discloses a cartridge capable of use in combination with a recorder/reproducer for recording and reproducing information on a strip member capable of having information stored thereon, such as for example magnetic tape. The strip member has at least one section having an optical transparency which differs from a portion of the strip member which stores the information. The cartridge contains reflective means which are used to control the light path of a light beam passing through the strip member. Sensing means located on the recorder/reproducer indicate when the at least one section of the strip member passes by the reflective means. The sensing means is used to control tape motion.

The cartridge encloses two reels mounted in a coplanar relationship with the strip member connected between the reels. The cartridge contains at least one opening in the surface of a cartridge housing suitable to permit a light beam to enter and pass to the reflective means. The strip member follows a predetermined path within the cartridge adjacent at least one aperture in the cartridge.

The cartridge is adapted to be inserted in a planar direction or in a sliding manner into the recorder/reproducer. The housing may be so designed as to permit the cartridge to be reversed or inverted and reinserted in the recorder/reproducer. When the cartridge is removed, means are provided to lock the two reels to prevent unravelling of the strip member. The lock may be adapted to be released by pressure applied to the pinch roller by a drive capstan when the cartridge is inserted into the recorder/reproducer.

Figure 1:
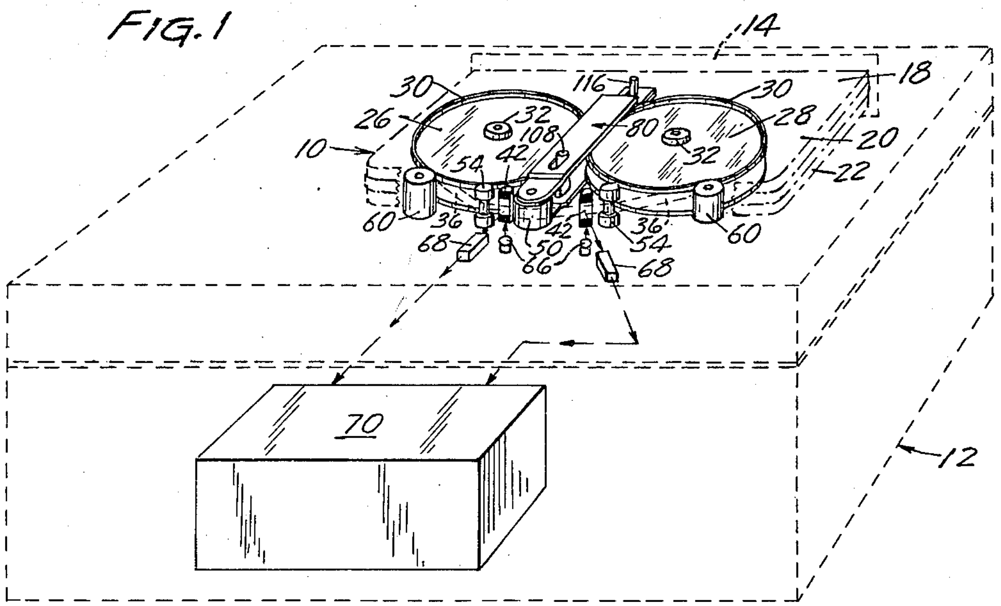
FIGURE 1 is a diagrammatic illustration of one embodiment of a cartridge of the present invention in combination with a recorder/reproducer.

FIGURE 1 depicts one embodiment of a cartridge of the present invention, generally designated as 10. The cartridge 10 is capable of being used in combination with a recorder/reproducer, generally designated as 12. The recorder/reproducer 12 has an elongated opening, generally designated as 14, in one of its walls and into which the cartridge 10 can be inserted. The cartridge 10 can be inserted in a planar direction by merely sliding the cartridge 10 into the recorder/reproducer 12 through opening 14. The recorder/reproducer 12 includes the necessary driving means such as the reel and capstan drives and associated electrical circuitry including a transducer head 16 and tape sensing systems. Certain elements also appear in FIGURE 2.

In one embodiment, the cartridge 10 includes a housing 18 having upper and lower portions 20 and 22 respectively. In the preferred embodiment, the housing 18 is constructed of metal to produce a tough and durable cartridge 10. The housing 18 rotatably supports and encloses two reels 26 and 28 in a coplanar relationship between the upper portion 20 and the lower portion 22. Each reel 26 and 28 has edges which in this embodiment are flanges 30. Also, each reel 26 and 28 includes hubs 32.

A strip member, such as for example a magnetic recording tape, generally designated as 36, is connected to hubs 32 of reels 26 and 28.

In this embodiment, the strip member 36 is a magnetic recording tape which is formed by a magnetic coating on a transparent or translucent backing, such as for example a polyester film backing. It is contemplated that by selectively removing or eliminating a portion of the magnetic coating from the backing, at least one section of the strip member 36 has a optical transparency which differs from a portion of the strip member 36 which is capable of having the information stored thereon. Thus, the transparent or translucent section of the tape can be located either intermediate the tape or at the ends thereof.

An alternative arrangement may include a transparent or translucent strip member attached to or having an opaque section. Thus, it is contemplated that the at least one section of the strip member having a different optical transparency may be located at intermediate positions along the strip member 36 rather than at the ends as noted in the present embodiment. Also, it is contemplated that a leader could be connected to the strip member to perform substantially the same function as the at least one section of the strip member described above. The strip member 36 is transported along a predetermined path within the cartridge 10 between reels 26 and 28.

In this embodiment, the upper portion 20 and the lower portion 22 have openings therein, generally designated as 40. The surface of the housing 18 adjacent the predetermined path contains an opening 38. Each of the openings 38 and 40 are capable of having a light beam passed therethrough. Also, each of the openings 40 support a reflecting means, such as for example reflectors 42. The opening 38 is positioned to cooperate with reflectors 42. Generally, the reflectors 42 function to reflect a light beam along a light path which includes the strip member 36.

The housing 18 is designed to have arcuate cut-away portions 46 and 48 which permit the flanges 30 of reels 26 and 28 to extend beyond the housing 18. Also, the cartridge 10 has a pinch roller 50 rotatably supported within the housing 18. The pinch roller 50 is generally located between the reels 26 and 28, adjacent the predetermined path which the strip member 36 travels and is adapted to releasably engage one side of the strip member 36. Also, it is contemplated that the pinch roller 50 could be located externally to the cartridge 10 and be inserted therein through an opening located within the cartridge 10.

Guide means, generally designated as 54, are disposed between each of the reels 26 and 28 and the pinch roller 50 to guide the strip member 36 as it winds and unwinds between the reels 26 and 28 along a predetermined path past the reflectors 42 and the pinch roller 50.

The recorder/reproducer 12 includes certain elements and electronic circuitry which cooperate with the cartridge 10 and strip member 36 contained therein when the cartridge 10 is inserted into the recorder/reproducer 12. For example, the recorder/reproducer 12 includes driving means comprising flange engaging means which in this embodiment are driving rollers, generally designated as 60. Driving rollers 60 are capable of being selectively driven, i.e. at slow or high speeds, by driving motors (not shown) and are positioned such that they releasably engage the rim of the flanges 30 of each of the reels 26 and 28. The driving rollers 60 drive the reels 26 and 28 in a predetermined direction such that the tape winds and unwinds along the predetermined path.

The recorder/reproducer 12 further includes a drive capstan 62 which is adapted to releasably engage the other side of strip member 36. The drive capstan is positioned within the recorder/reproducer 12 on the opposite side of the strip member 36 to drive the strip member 36 along the predetermined path through a nip formed between the pinch roller 50 and the drive capstan 62.

The recorder/reproducer 12 further includes a light source, such as for example lamps 66, which are energized from a power source (not shown). The lamps 66 are positioned to pass a light beam emanating therefrom through openings 40 and into the reflectors 42. Light responsive means, such as for example photodiodes 68, are positioned at substantially a 90° angle relative to the lamps 66 and adjacent the strip member 36. The photodiodes 68 are electrically connected to a strip material sensing system which in this embodiment is a tape sensing system 70. The tape sensing system 70 is responsive to the photodiodes 68 to control strip member motion.

The cartridge 10 is illustrated herein as being symmetrical. An axis of symmetry 72 runs from the front to the rear of the cartridge 10 between the reels 26 and 28 and equidistant from the upper portion 20 and lower portion 22 of the housing 18. When the cartridge 10 is rotated 180° about the axis of symmetry 72 (i.e. reversed or inverted for reinsertion into the recorder/reproducer 12), opening 40 on one portion of the housing 18 is substantially positioned in the same location as opening 40 on the other portion of the housing 18 prior to the rotation of the cartridge 10. Reels 26 and 28, guide means 54, reflectors 42 and a reel control means, generally designated as 80, are symmetrically mounted within the housing 18 with respect to the axis of symmetry 72. Thus, the cartridge 10 is reversible and can be inserted into the recorder/reproducer 12 having either surface face-up. Such a design permits multitrack recording on the strip member 36.

In one embodiment, the strip member 36 has the transparent or translucent sections located at the ends thereof, which sections are connected to the hubs 32 of the reels 26 and 28 to indicate the position of the strip member 36, such as for example indicating end-of-tape. For example, the end-of-tape sensing is accomplished by the recorder/reproducer 12 in the following manner. Generally, the light beam from light source 66 passes along a light path described by opening 40, reflectors 42, strip member 36, opening 38 and a photodiode 68. When the magnetic coating of the strip member 36 is positioned between the reflectors 42 and photodiodes 68, the light beam transmission is interrupted. When this occurs, the tape sensing system 70, in response to the absence of light impinging on photodiodes 68, senses that the strip member 36 is in recording position. When the driving means winds substantially all of the strip member 36 on one reel, such as for example reel 26, the transparent or translucent section extends from the hub 32 of reel 28 to a point past reflectors 42. The difference in optical transparency in the section of the strip member 36 permits the light beam from reflectors 42 to impinge on and actuate the photodiodes 68. The tape sensing system 70 is responsive to the photodiodes 68 being actuated to terminate tape drive.

It is contemplated that the tape sensing system 70 could be used for sensing conditions other than end-of-tape. For example, alteration of light beam transmission may be used to initiate such functions as automatic rewind, sensing direction of strip member travel and the like.

As another example, the tape sensing system 70 can be used for cuing or controlling tape position. To control tape position during recording, the strip member 36 or tape is passed by one of the reflectors 42, past a transducer head (shown in FIGURE 2), between pinch roller 50 and capstan 62 to the other reflector 42. Thus, the strip member 36 or tape is located across the transducing head and is ready to record information. To control tape position during playback, the strip member 36 or tape is initially rewound under control of the tape sensing system 70. Then, tape sensing system 70 unwinds and positions the tape such that the beginning of magnetic coating is adjacent only one of the reflectors 42 and before the transducing head such that all of the information recorded on the strip member 36 or tape can be reproduced. It is apparent that other combinations of tape control are possible to persons skilled in the art and the tape sensing system 70 can be so programmed.

Figure 3:
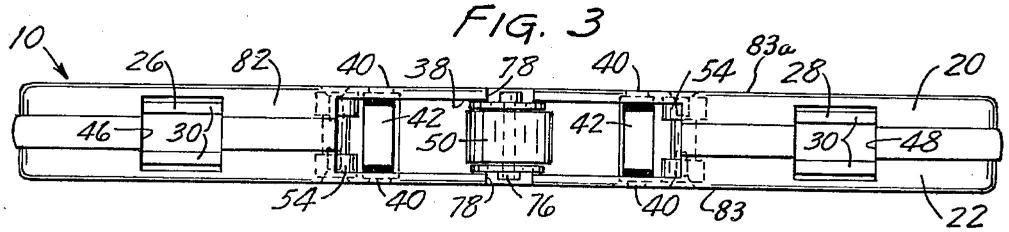
FIGURE 3 is a front view of the assembled cartridge of FIGURE 2 with the strip member removed.

FIGURE 2 is a top view of the cartridge 10, having the upper portion 20 removed, in operative engagement with the recorder/reproducer 12. FIGURE 3 is a front view of the assembled cartridge 10, part of which is illustrated in FIGURE 2 with the strip member 36 removed. In FIGURES 2 and 3, the reels 26 and 28 are rotatably supported by means of hubs 32 between the upper portion 20 and lower portion 22 which form the housing 18. Reels 26 and 28 extend beyond the arcuate cut-away portions 46 and 48 and are adapted to be driven by flange engaging means 60. Also, a portion of each of the flanges 30 cooperates with the reel control means 80.

The pinch roller 50, in this embodiment, is rotatably mounted on a shaft 76. The shaft 76 has extended ends which cooperate with an alignment means 74 located on the recorder/reproducer 12. The alignment means 74 is illustrated in greater detail in FIGURE 6.

An elongated section 78, illustrated in FIGURE 2 in lower portion 22, is cut out of both upper portion 20 and lower portion 22 of the housing 18 to cooperate with alignment means 74. Each of the elongated sections 78 are identical and are positioned opposite each other. The sections 78 are substantially centered and extend from a point adjacent the predetermined path toward the rear of the cartridge 10.

The upper portion 20 and lower portion 22 of the housing 18 define a first surface, generally indicated as 82. The first surface 82 is adjacent the predetermined path along which the strip member 36 is transported. The first surface 82 has at least one opening 38, which opening is adjacent the predetermined path.

The lower portion 22, see FIGURES 2 and 3, includes a second surface 83 contiguous the first surface 82. In this embodiment, the lower portion 22 is illustrated to have a curved edge which cooperates mates with a curved edge wall of the upper portion 20 to form the enclosure edge. The second surface 83 of lower portion 22 has two openings 40 each symmetrically located about the axis 72. The upper portion 20 includes a third surface **83*a* contiguous the first surface 82. The third surface 83*a* has two openings 40 each symmetrically located about the axis 72 and each located opposite the openings 40 located in the second surface 83. Each of the openings 40 and 38** should be capable of having a light beam directed therethrough.

The reflectors 42 and the guide means 54 are operatively mounted within the housing 18 adjacent the predetermined path. The reflectors 42 are positioned within the openings 40 and extend between the second surface 83 and the third surface **83*a*. The reflectors 42 function to direct a light beam along a light path which continues through a translucent portion of the strip member 36 and through the opening 38 to impinge upon the photodiodes 68. Transmission of the light beam is altered or interrupted when a non-translucent portion of the strip member 36 passes between the reflectors 42 and the opening 38**.

Figure 4:
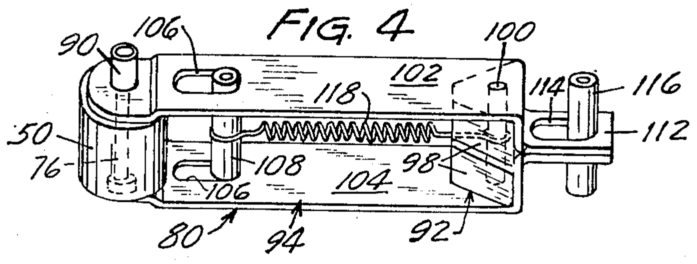
FIGURE 4 is a diagrammatic representation of a reel control means generally illustrated in FIGURE 2.

FIGURE 4 illustrates diagrammatically in greater detail the reel control means 80. The reel control means 80 generally includes a mounting means 90, a locking means 92, a connecting means 94 and the pinch roller 50.

The mounting means 90 includes the shaft 76 which passes axially through the pinch roller 50. The ends of the shaft 76 extend beyond the pinch roller 50 and are adapted to releasably engage the alignment means 74 to properly position and align the pinch roller 50 relative to the strip member 36.

In this embodiment, the locking means 92 comprises two triangular-shaped locking devices 98 mounted in a stacked relationship. In one embodiment, the locking devices 98 are formed of a resilient material having an aperture therein through which a pin 100 passes. The locking devices 98 engage the flanges 30 of reels 26 and 28 to brake the reels. Braking is obtained by forcing the locking devices 98 against the edge of the flanges 30.

The connecting means 94 is a bifurcated member including elements 102 and 104. The shaft 76, including the pinch roller 50, and the locking devices 98 are mounted in a coaxial relationship between elements 102 and 104. The shaft 76 extends through openings in the elements 102 and 104 such that the shaft ends protrude above the surface of each element 102 and 104. Pin 100, which secures the locking devices 98, is rigidly connected to elements 102 and 104. The elements 102 and 104 have slots or elongated openings 106 through which a shaft 108 passes. Shaft 108 is, in turn, rigidly connected to the housing 18 such that the reel control means 80 can move back and forth within the housing 18.

Elements 102 and 104 terminate in a common end 112 at an end opposite the pinch roller 50. The common end 112 has an elongated opening or slot 114 therein through which a shaft 116 passes. Shaft 116 is rigidly connected to housing 18 in a manner similar to that for shaft 108. Slots 106 and 114 cooperate with shafts 108 and 116 respectively to permit the reel control means 80 to move between a locking position and an unlocking position.

The reel control means 80 is in a locking position when the surfaces of locking devices 98 are in releasable engagement with the flanges 30. When the pinch roller 50 is urged into the interior of the housing 18, elements 102 and 104 move the locking devices 98 to an unlocking position. The reels 26 and 28 can be rotated to move the strip member 36 along the predetermined path. Movement of the pinch roller 50, of the locking means 92 and of the connecting means 94 is effected by the drive capstan 62 of the recorder/reproducer 12. The drive capstan 62 comes into releasable engagement with the strip member 36 and urges the pinch roller 50 into the housing 18. The strip member 36 is advanced through the nip formed between pinch roller 50 and drive capstan 62.

The reel control means 80 further includes a retaining means, which may be any resilient means, such as for example a spring 118. The spring 118 maintains the reel control means 80 normally in the locking position. The force of the retaining means or spring 118 is overridden by the drive capstan 62 engaging and urging the pinch roller 50 into the cartridge 10. Thus, when the drive capstan 62 is operatively engaged with the pinch roller 50, the locking means 92 is moved from a locking position to an unlocking position to permit the reels 26 and 28 to be rotated.

FIGURE 5 shows in greater detail the reflectors 42 which was generally shown in FIGURES 2 and 3. In this embodiment, the reflector 42 comprises a generally cylindrical-shaped member 128 having a planar or flat area 136 formed in one portion of its outer periphery. Member 128 has a notched-out section 130 opposite the planar area 136 and generally in the center of member 128. The notched-out section 130 results in two substantially identical reflecting surfaces 132 positioned at a predetermined angle theta ($\theta$) relative to the axis 134 of the member 128. The angle $\theta$ is selected such that a light beam passing along axis 134 is reflected by one of the surfaces 132 at a 90° angle to its former path. Portions 140 of the planar area 136 adjacent the ends of the member 128 may be blocked, shaded or controlled such that the light beam does not scatter as it is deflected through the reflector 42. In one application, the member 128 is coated with an opaque material. The coated portions 140 of planar area 136 are positioned adjacent the predetermined path.

In one embodiment, the reflective member 128 is made from an acrylic plastic material, such as lucite, having a diameter in the order of ¼ inch (about .6 cm.) and a length of approximately ¾ inch (about 2 cm.). The reflective surfaces are each formed at an angle $\theta$ of approximately 45° relative to the axis 134 and are polished to obtain a high degree of reflectivity. The acrylic member 128 has tabs at both ends to cooperate with openings 40.

FIGURE 6 illustrates in greater detail the alignment means 74 on the recorder/reproducer 12 shown in FIGURE 2. The alignment means 74 includes an upper support 142 which has a slot 144 formed therein and a lower support 146 having a slot 148 formed therein. Supports 142 and 146 are finger-like supports which generally extend into elongated section 78 (illustrated in FIGURE 2). The ends of shaft 76 slideably engage slots 144 and 148 as the cartridge 10 is inserted in the planar direction into the recorder/reproducer 12. The slots 144 and 148 fix the shaft 76 in a direction which is substantially perpendicular to the direction of movement of the strip member 36. The aligned pinch roller 50 uniformly engages and drives the entire surface of strip member 36. The alignment means 74 maintains the pinch roller 50 in axial alignment relative to drive capstan 62 thereby providing uniform contact on the entire driving surface of the pinch roller 50.

In order to have a fast rewind or forward capability, it is apparent that the recorder/reproducer 12 could include means for disengaging the pinch roller 50 out of releasable engagement with the strip member 36 and into an out-of-the-way position into the housing 18. When this occurs, the locking devices 98 are in an unlocking position and the reels 26 and 28 can be rotated at a high rate for fast movement of the strip member 36.

FIGURES 7A and 7B are pictorial representations of the light path of a light beam passing from light source 66 to the light responsive means 68, each of which are located on the recorder/reproducer 12. When the light source 66 is illuminated and the transparent or translucent section of strip member 36 is between the reflector 42 and opening 38, a light beam follows the light path illustrated in FIGURE 7A or FIGURE 7B.

In FIGURE 7A, the light source 66 is located below the cartridge 10 while the light responsive means 68 is located on substantially the same plane as that of cartridge 10. FIGURE 7B illustrates the opposite relationship wherein the light source 66 and the light responsive means 68 are interchanged. When the light source 66 is located below the cartridge 10 as illustrated in FIGURE 7A, the light beam enters through opening 40, passes axially along reflector 42, is reflected at approximately a 90° angle by one of the reflecting surfaces 132 and passes through the strip member 36 and opening 38 onto light responsive means 68. When the light source 66 is located on substantially the same plane as cartridge 10 as shown in FIGURE 7B, the light beam initially passes through opening 38 and strip member 36 onto one of the reflecting surfaces 132 within the reflector 42 and is deflected at approximately a 90° angle through opening 40 onto light responsive means 68. As indicated herein, the location of openings 40 and 38, the positioning of reflector 42 and the identical reflecting surfaces 132 provide a symmetrical reflector. Thus, the cartridge 10 is capable of providing substantially the same operation when the cartridge 10 is reversibly inserted into the recorder/reproducer 12. In the arrangement of either FIGURE 7A or FIGURE 7B, the light responsive means 68, upon having the light beam impinge thereon, actuates the tape sensing system 70 as discussed hereinbefore.

It is apparent that a person skilled in the art could make modifications, improvements and the like to the present invention and all such modifications, improvements and the like are deemed to be within the scope of the invention.

What is claimed is:

1. A symmetrical tape cartridge capable of inverted insertion in a recorder/reproducer and capable of enclosing two reels mounted in a first plane having a strip member extending therebetween, said strip member including a first portion capable of having information stored thereon and including a second portion having a translucent section for transmitting a light beam, and wherein said strip member is transported along a predetermined path within said cartridge for winding and unwinding on said reels, said cartridge comprising:

(a) a symmetrical housing to allow inverted insertion of said cartridge in a first position or a second position into a recorder/reproducer, said housing including (1) an axis of symmetry, (2) a first surface adjacent said predetermined path and substantially perpendicular to said axis of symmetry, (3) a second surface substantially parallel to said first plane, (4) a third surface substantially parallel to said first plane and spaced from said second surface to enclose said reels between said second and third surfaces, (5) said housing being adapted to rotatably support said reels, (6) said first surface having a first opening symmetrically located relative to said axis of symmetry, (7) said second surface including a second opening and said third surface including a third opening, each opening symmetrically located relative to each other on opposite sides of said axis and adjacent said first surface wherein when said cartridge is rotated 180° about said axis of symmetry said second opening on said second surface is positioned substantially in the same location as said third opening on said third surface prior to rotation of said cartridge;

(b) a first generally cylindrically shaped light reflector mounted within said second opening for directing a light beam along a light path described by said second opening, by said first light reflector, by said translucent section of said strip member and by said first opening when said cartridge is in said first position, and wherein said first reflector includes a first tab for insertion into said second opening;

(c) a second generally cylindrically shaped light reflector mounted within said third opening for directing a light beam along a light path described by said third opening, by said second light reflector, by said translucent section of said strip member and by said first opening when said cartridge is in said second position, and wherein said second reflector includes a second tab for insertion into said third opening;

(d) each of said first and second reflectors further includes a planar area formed on a portion of its outer periphery and a notched out section located on the outer periphery opposite said planar area, said notched out section forming at least one reflecting surface at a predetermined angle relative to the axis of said reflector, and wherein said first and second tab has been adapted to cooperate with said second and third openings, respectively, such that said planar area is positioned adjacent said predetermined path, said first and second reflectors being partially coated with an opaque material on said planar area adjacent said first and second tab to minimize scattering of a light beam being reflected by said at least one reflecting surface;

(e) a pinch roller rotatably mounted within said housing adjacent said predetermined path equidistant from each of said reels to releasably engage one side of strip member, said pinch roller being adapted to cooperate with a drive capstan of a recorder/reproducer positioned to releasably engage the opposite side of said strip member to drive said strip member along said predetermined path and through the nip formed between said pinch roller and a drive capstan;

(f) a locking means positioned to concurrently engage at least one edge of each reel on a side opposite said predetermined path, said locking means when releasably engaging said reel edges being in a locking position and when disengaged from said reel edges being in an unlocking position;

(g) a connecting means symmetrically positionned along said axis of symmetry adapted to rotatably support said pinch roller at one end thereof and for rigidly supporting said locking means at the other end thereof, said connecting means including means for retaining said locking means and a locking position, said retaining means being capable of being moved from a locking position to an unlocking position by a drive capstan engaging said pinch roller to permit said reels to be rotated;

(h) a resilient means mounted between said housing and said connecting means for producing a force which urges said locking means into a locking position when a cartridge is disengaged from a recorder/reproducer; and (i) guide means operatively mounted with said housing symmetrical relative to said axis of symmetry adjacent said predetermined path to guide said strip member along said predetermined path.

2. A symmetrical tape cartridge capable of inverted insertion in a recorder/reproducer and capable of enclosing two reels mounted in a first plane having a strip member extending therebetween, said strip member including a first portion capable of having information stored thereon and including a second portion having a translucent section for transmitting a light beam, and wherein said strip member is transported along a predetermined path within said cartridge for winding and unwinding on said reels, said cartridge comprising:

(a) a symmetrical housing to allow inverted insertion of said cartridge in a first position or a second position into a recorder/reproducer, said housing including (1) an axis of symmetry, (2) a first surface adjacent said predetermined path, (3) a second surface substantially parallel to said first plane, (4) a third surface substantially parallel to said first plane and spaced from said second surface to enclose said reels between said second and third surfaces, (5) said housing being adapted to rotatably support said reels, (6) said first surface having a first opening symmetrically located relative to said axis of symmetry, (7) said second surface including a second opening and said third surface including a third opening, each opening symmetrically located relative to each other on opposite sides of said axis and adjacent said first surface wherein when said cartridge is rotated 180° about said axis of symmetry said second opening on said second surface is substantially positioned in the same location as said third opening on said third surface prior to rotation of said cartridge;

(b) a first light reflector mounted within said second opening for directing a light beam along a light path described by said second opening, by said first light reflector, by said translucent section of said strip member and by said first opening, when said cartridge is in said first position;

(c) a second light reflector mounted within said third opening for directing a light beam along a light path described by said third opening, by said second light reflector, by said translucent section of said strip member and by said first opening, when said cartridge is in said second position;

(d) a pinch roller rotatably mounted within said housing adjacent said predetermined path and located along said axis of symmetry, said pinch roller to releasably engage one side of said strip member and adapted to cooperate with a drive capstan of a recorder/reproducer positioned to releasably engage the opposite side of said strip member to drive said strip member along said predetermined path and through the nip formed between said pinch roller and a drive capstan;

(e) a locking means positioned to concurrently engage at least one edge of each reel on a side opposite said predetermined path, said locking means when releasably engaging said reel edges being in a locking position and when disengaged from said reel edges being in an unlocking position;

(f) a connecting means symmetrically positioned along said axis of symmetry adapted to rotatably support said pinch roller at one end thereof and for rigidly supporting said locking means at the other end thereof, said connecting means including means for retaining said locking means in a locking position, said retaining means being capable of being moved from a locking position to an unlocking position by a drive capstan engaging said pinch roller to permit said reels to be rotated;

(g) a resilient means mounted between said housing and said connecting means for producing a force which urges said locking means into a locking position when a cartridge is disengaged from a recorder/reproducer; and (h) guide means operatively mounted with said housing symmetrical relative to said axis of symmetry adjacent said predetermined path to guide said strip member along said predetermined path.

3. A symmetrical tape cartridge of claim 2, wherein each of said first and second reflectors further comprises a generally cylindrically shaped acrylic member having a planar area formed on a portion of its outer periphery and a notched out section located on the outer periphery opposite said planar area, said notched out section forming at least one reflecting surface at a predetermined angle relative to the axis of said reflector, and wherein said first and second reflector includes a first and second tab each adapted to cooperate with said second and third openings, respectively, such that said planar area is positioned adjacent said predetermined path, said first and second reflectors being partially coated with an opaque material on said planar area adjacent said first and second tab to minimize scattering of a light beam being reflected by said at least one reflecting surface.

4. In combination, a recorder/reproducer and a cartridge for containing a strip member having a first portion which is capable of having information stored thereon and a second portion having a different optical transparency than said first portion, said strip member being transported along a predetermined path between two reels mounted in a first plane within said cartridge, said cartridge being adapted to be inserted in a planar direction into said recorder/reproducer, said cartridge comprising a housing adapted to enclose and rotatably support said reels mounted in a coplanar relationship, said housing having a first opening located on a first surface adjacent said predetermined path across which said strip member is transported and a second opening located on a second surface contiguous said first surface, each of said openings being capable of having a light beam directed therethrough;

reflecting means mounted within said housing positioned relative to said first and said second openings for directing a light beam along a light path described by said second opening, by said reflecting means, by said strip member being transported along said predetermined path, and by said first opening such that transmission of said light beam is altered when said first portion of said strip member passes between said reflecting means and said first opening;

a pinch roller having two ends adapted to be located within said housing;

mounting means including a shaft passing axially through said pinch roller, said shaft extending beyond the ends of said pinch roller, said mounting means positioning said pinch roller within said housing adjacent said predetermined path such that the surface of said pinch roller releasably engages one side of said strip member, said pinch roller being capable of cooperating with a drive capstan located on said recorder/reproducer and positioned to releasably engage the opposite side of said strip member whereby said strip member is driven along said predetermined path and through a nip formed between said pinch roller and said drive capstan; said recorder/reproducer comprising driving means positioned to externally drive said reels for transporting said strip member along said predetermined path between said reels and past said first opening, said driving means including flange engaging means positioned to releasably engage the flanges of said reels for differentially driving said reels to transport said strip member therebetween along said predetermined path past said first opening while maintaining said strip member in tension;

a light source positioned relative to said second opening for producing a light beam which is directed along said light path;

a light responsive means positioned relative to said first opening for receiving said light beam passed through said strip member and through said first opening whereby the transmission of said light beam to said light responsive means is altered when said first portion passes between said reflecting means and said first opening;

a drive capstan; and alignment means mounted to permit said drive capstan to be passed therethrough into releasable engagement with the other side of said strip member, said alignment means including grooves adapted for receiving said extended shaft to align said pinch roller relative to said drive capstan such that said strip member is uniformly driven along said predetermined path.

5. The combination of claim 4 wherein (a) said housing is symmetrical to allow inverted insertion of said cartridge in a first position or a second position into said recorder/reproducer, said housing including (1) an axis of symmetry, (2) said first surface being adjacent said predetermined path and substantially perpendicular to said axis of symmetry, (3) a second surface substantially parallel to said first plane, (4) a third surface substantially parallel to said first plane and spaced from said second surface to enclose said reels between said second and third surfaces, (5) said first opening being symmetrically located relative to said axis of symmetry, (6) said third surface including a third opening, each of said second and third openings being symmetrically located relative to said axis of symmetry on opposite sides of said axis and adjacent said first surface wherein when said cartridge is rotated 180° about said axis of symmetry said second opening on said second surface is substantially positioned in the same location as said third opening on said third surface prior to rotation of said cartridge; and (b) wherein said reflecting means includes a first reflector mounted within said second opening and a second reflector mounted within said third opening, each reflector predetermined path is such that when said cartridge is reversibly reinserted into said recorder/reproducer said light beam from said light source is deflected by said reflectors along said light path to said light responsive means for alternatively directing a light beam along said light path.

6. In combination, a recorder/reproducer and a cartridge for containing a strip member having a first portion which is capable of having information stored thereon and a second portion having a different optical transparency than said first portion, said strip member being transported along a predetermined path between two reels mounted in a coplanar relationship within said cartridge, said cartridge being adapted to be inserted in a planar direction into said recorder/reproducer, said cartridge comprising a housing adapted to enclose and rotatably support said reels mounted in a coplanar relationship, said housing having a first opening located on a first surface adjacent said predetermined path across which said strip member is transported and a second opening located on a second surface contiguous said first surface, each of said openings being capable of having a light beam directed therethrough;

reflecting means mounted within said housing positioned relative to said first and said second openings for directing a light beam along a light path described by said second opening, by said reflecting means, by said strip member being transported along said predetermined path, and by said first opening such that transmission of said light beam is altered when said first portion of said strip member passes between said reflecting means and said first opening; a pinch roller having two ends adapted to be located within said housing;

mounting means including a shaft passing axially through said pinch roller, said shaft extending beyond the ends of said pinch roller, said mounting means positioning said pinch roller within said housing adjacent said predetermined path such that the surface of said pinch roller releasably engages one side of said strip member, said pinch roller being capable of cooperating with a drive capstan located on said recorder/reproducer and positioned to releasably engage the opposite side of said strip member whereby said strip member is driven along said predetermined path and through a nip formed between said pinch roller and said drive capstan, said recorder/reproducer comprising driving means positioned to externally drive said reels for transporting said strip member along said predetermined path between said reels and past said first opening, said driving means including flange engaging means positioned to releasably engage the flanges of said reels for differentially driving said reels to transport said strip member therebetween along said predetermined path past said first opening while maintaining said strip member in tension;

a light source positioned relative to said first opening for producing a light beam which is directed along said light path;

a light responsive means positioned relative to said second opening for receiving said light beam passed through said first opening, through said reflecting means, and through said second opening whereby the transmission of said light beam to said light responsive means is altered when said first portion passes between said reflecting means and said first opening;

a drive capstan; and alignment means mounted to permit said drive capstan to be passed therethrough into releasable engagement with the other side of said strip member, said alignment means including grooves adapted for receiving said extended shaft to align said pinch roller relative to said drive capstan such that said strip member is uniformly driven along said predetermined path.

References Cited

UNITED STATES PATENTS

| | | | |
|---|---|---|---|
| 2,455,187 | 11/1948 | Owens | 242—57 X |
| 2,661,162 | 12/1953 | Owens | 242—55.13 |
| 2,821,576 | 1/1958 | Gaubert. | |
| 2,971,716 | 2/1961 | Sampson | 242—55.13 |
| 2,989,261 | 6/1961 | Gillette et al. | 242—55.13 |
| 3,075,717 | 1/1963 | Kingston | 242—55.13 |

FOREIGN PATENTS

| | | | |
|---|---|---|---|
| 1,094,401 | 12/1954 | France. | |

GEORGE F. MAUTZ, Primary Examiner

U.S. Cl. X.R.

242—192, 198, 200

UNITED STATES PATENT OFFICE

CERTIFICATE OF CORRECTION

Patent No. 3,497,157 Dated February 24, 1970

Inventor(s) R. H. HANES ET AL

It is certified that error appears in the above-identified patent and that said Letters Patent are hereby corrected as shown below:

Column 3, Line 3, cancel "diagramamtic" and insert --diagrammatic--. Column 4, Line 1, cancel "a" and insert --an--. Column 6, Line 31, delete "cooperates". Column 9, Line 73, cancel "positionned" and insert --positioned--.

SIGNED AND SEALED
OCT 13 1970

(SEAL)
Attest:

Edward M. Fletcher, Jr.
Attesting Officer

WILLIAM E. SCHUYLER, JR.
Commissioner of Patents

USCOMM-DC 60376-P69
★ U.S. GOVERNMENT PRINTING OFFICE : 1969 O—366-334